United States Patent
Noh et al.

(10) Patent No.: US 8,699,442 B2
(45) Date of Patent: Apr. 15, 2014

(54) METHOD AND APPARATUS FOR TRANSMITTING DATA FRAME IN WLAN SYSTEM

(75) Inventors: Yu Jin Noh, Anyang-si (KR); Byeong Woo Kang, Anyang-si (KR); Dae Won Lee, Anyang-si (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 151 days.

(21) Appl. No.: 13/505,409

(22) PCT Filed: Jun. 28, 2011

(86) PCT No.: PCT/KR2011/004715
§ 371 (c)(1),
(2), (4) Date: May 1, 2012

(87) PCT Pub. No.: WO2012/002705
PCT Pub. Date: Jan. 5, 2012

(65) Prior Publication Data
US 2012/0218983 A1    Aug. 30, 2012

Related U.S. Application Data

(60) Provisional application No. 61/359,796, filed on Jun. 29, 2010.

(51) Int. Cl.
*H04W 4/00*    (2009.01)
*H04J 3/16*    (2006.01)

(52) U.S. Cl.
USPC ............ 370/329; 370/311; 370/338; 455/464

(58) Field of Classification Search
USPC ........................ 370/311–449; 455/421–466
See application file for complete search history.

(56) References Cited

U.S. PATENT DOCUMENTS

| | | | | |
|---|---|---|---|---|
| 5,850,400 | A * | 12/1998 | Eames et al. | 370/443 |
| 7,499,425 | B2 * | 3/2009 | Yew et al. | 370/329 |
| 7,940,687 | B2 * | 5/2011 | Sampath | 370/252 |
| 8,483,105 | B2 * | 7/2013 | Nanda et al. | 370/278 |
| 2007/0058605 | A1 * | 3/2007 | Meylan et al. | 370/346 |
| 2008/0259857 | A1 * | 10/2008 | Zheng | 370/329 |
| 2009/0059877 | A1 | 3/2009 | Utsunomiya et al. | |
| 2009/0196364 | A1 | 8/2009 | Nakajima et al. | |
| 2010/0056069 | A1 | 3/2010 | Toshimitsu et al. | |
| 2010/0135268 | A1 | 6/2010 | Seok | |

(Continued)

FOREIGN PATENT DOCUMENTS

| | | |
|---|---|---|
| JP | 2009-55464 A | 3/2009 |
| JP | 2010-56761 A | 3/2010 |
| KR | 10-2010-0042228 A | 4/2010 |
| WO | WO 2010-009039 A1 | 1/2010 |

*Primary Examiner* — Afsar M Qureshi
(74) *Attorney, Agent, or Firm* — Birch, Stewart, Kolasch & Birch, LLP

(57) ABSTRACT

A method of transmitting a data frame in a wireless local area network is provided. The method includes TXOP the step of: obtaining a transmission opportunity (TXOP) indicating a time interval during which a transmitter has a right to transmit at least one data frame and an available bandwidth for the TXOP and sequentially transmitting a plurality of data frames to at least one receiver during the TXOP, wherein a bandwidth of a subsequent data frame of the plurality of data frames is same to or narrower than a bandwidth of a preceding data frame of the plurality of data frames which is last previously transmitted before the subsequent data frame.

12 Claims, 12 Drawing Sheets

(56) References Cited

U.S. PATENT DOCUMENTS

| | | |
|---|---|---|
| 2011/0199953 A1 | 8/2011 | Seok |
| 2011/0310834 A1* | 12/2011 | Seok .............................. 370/329 |
| 2012/0320856 A1* | 12/2012 | Kim et al. ..................... 370/329 |

* cited by examiner

METHOD AND APPARATUS FOR TRANSMITTING DATA FRAME IN WLAN SYSTEM

CROSS REFERENCE TO RELATED APPLICATIONS

This application is the National Phase of PCT/KR2011/004715 filed on Jun. 28, 2011, which claims priority under 35 U.S.C. 119(e) to U.S. Provisional Application No. 61/359,796 filed on Jun. 29, 2010, all of which are hereby expressly incorporated by reference into the present application.

TECHNICAL FIELD

The present invention relates to a Wireless Local Area Network (WLAN) system, and more particularly, to a method of a station (STA) transmitting a data frame in a WLAN system.

BACKGROUND ART

Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

In order to overcome a limit to the communication speed that has been considered as weakness in the WLAN technique, an IEEE 802.11n standard has recently been standardized as a technology standard. The object of the IEEE 802.11n standard is to increase the speed and reliability of a network and to expand the coverage of a wireless network. More particularly, in order to support a High Throughput (HT) having a data processing speed of 540 Mbps or higher, minimize a transmission error, and optimize the data rate, the IEEE 802.11n standard is based on Multiple Inputs and Multiple Outputs (MIMO) technology in which multiple antennas are used on both sides of each of a transmitter and a receiver.

As the propagation of the WLAN is being activated and applications employing the WLAN are being diversified, in an STA, a necessary for a new WLAN system for supporting a higher throughput than the data processing speed supported by the IEEE 802.11n standard is on the rise. The next-generation WLAN system supporting a Very High Throughput (VHT) is the next version of the IEEE 802.11n WLAN system and is one of IEEE 802.11 WLAN systems which have recently been proposed in order to support a data processing speed of 1 Gbps or higher in an MAC Service Access Point (SAP).

The next-generation WLAN system supports the transmission of a Multi-User Multiple Input Multiple Output (MU-MIMO) scheme in which a plurality of non-AP STAs accesses a radio channel at the same time in order to efficiently use the radio channel. According to the MU-MIMO transmission scheme, an AP can transmit a frame to one or more MIMO-paired non-AP STAs at the same time.

The AP and the plurality of MIMO-paired non-AP STAs may have different capabilities. A bandwidth, a Modulation Coding Scheme (MCS), and Forward Error Correction (FEC), that may be supported, may differ according to a kind of the non-AP STA, purposes, a channel environment, etc. If a channel bandwidth to be used to transmit STAs having different capabilities can be freely controlled within a TXOP (transmission opportunity) period, there may be generated interference with an AP or an STA or both which transmit and receive frames in a frequency band. Accordingly, reliability may become problematic when the frames are transmitted and received. Accordingly, there is a need for a method capable of transmitting a data frame to STAs with different capabilities while not generating interference with another AP or another STA or both within the TXOP period.

SUMMARY OF INVENTION

Technical Problem

The present invention provides a method in which a wireless local area network (WLAN) system can transmit frames to a plurality of STA by using the multi user multiple input multiple output (MU-MIMO) transmission scheme.

Solution to Problem

In an aspect, a method of transmitting a data frame in a wireless local area network is provided. The method includes the step of: obtaining a transmission opportunity (TXOP) indicating a time interval during which a transmitter has a right to transmit at least one data frame and an available bandwidth for the TXOP and sequentially transmitting a plurality of data frames to at least one receiver during the TXOP, wherein a bandwidth of a subsequent data frame of the plurality of data frames is same to or narrower than a bandwidth of a preceding data frame of the plurality of data frames which is last previously transmitted before the subsequent data frame.

The step of obtaining the TXOP may include exchanging a request to send (RTS) frame and a clear to send frame (CTS).

The CTS frame may include information parameter indicating the available bandwidth for the TXOP.

The available bandwidth for the TXOP may be same or narrower than a channel bandwidth of the RTS frame.

Each of the plurality of data frames may include a control part and a data part and the control part indicates the bandwidth of the corresponding data frame.

Each of the plurality of data frames may be a physical layer convergence procedure (PLCP) protocol data unit (PPDU).

At least one of the plurality of data frames may be transmitted by using multi user-multiple input multiple output (MU-MIMO) transmission.

In another aspect, a wireless apparatus is provided. The apparatus includes a transceiver configured to transmit and receive a radio signal and a processor operationally coupled to the transceiver. The processor is configured for the step of: obtaining a transmission opportunity (TXOP) indicating a time interval during which a transmitter has a right to transmit at least one data frame and an available bandwidth for the TXOP and sequentially transmitting a plurality of data frames to at least one receiver during the TXOP, wherein a bandwidth of a subsequent data frame of the plurality of data frames is same to or narrower than a bandwidth of a preceding data frame of the plurality of data frames which is last previously transmitted before the subsequent data frame.

Advantageous Effects of Invention

An access point (AP) transmits a data frame using a multiple bandwidth transmission scheme within a TXOP period. Accordingly, the entire throughput of a WLAN system can be improved because data can be transmitted to STAs having different channel bandwidth capabilities by efficiently using the channel bandwidths within the WLAN system.

When a channel bandwidth for transmitting a data frame is selected within a TXOP period, a bandwidth narrower than that used to transmit a previous data frame is selected. Accordingly, interference between other STAs can be prevented when frames are transmitted and received.

A TXOP period is allocated until a data frame matched with a specific channel bandwidth is transmitted and the data is transmitted within the TXOP period. A non-target transmission STA can access the remaining subchannels of an idle state and can transmit and receive an additional frame. Accordingly, the throughput can be improved.

MODE FOR THE INVENTION

Figure 1:
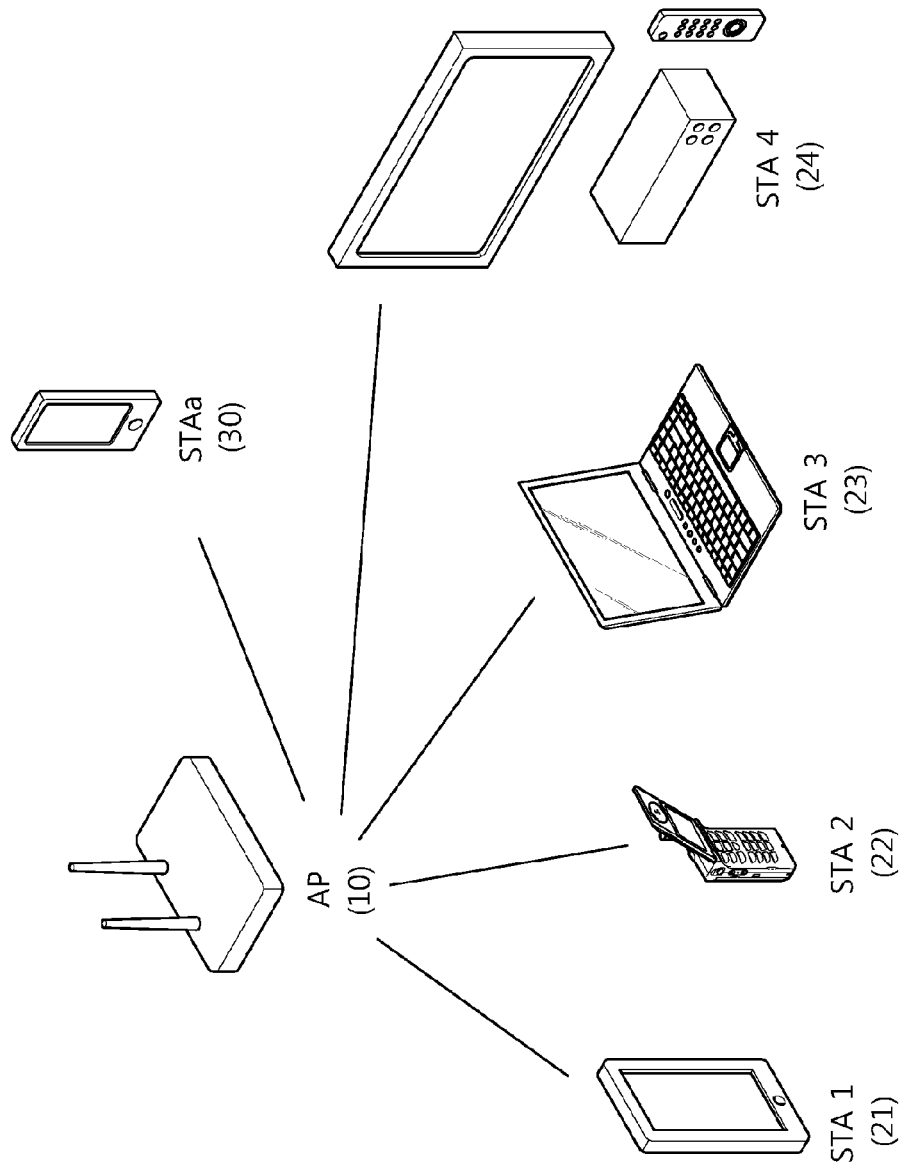
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a number of APs. In the infrastructure BSS, an AP manages the non-AP STAs of a BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to another terminology, such as a mobile terminal, a wireless device, a Wireless Transmit/Receive Unit (WTRU), User Equipment (UE), a Mobile Station (MS), a mobile subscriber unit, or a simply user. It is hereinafter assumed that the non-AP STA is an STA, for convenience of description.

An AP is a function medium, providing access to a DS via a radio medium, for an STA associated therewith. In an infrastructure BSS including an AP, communication between STAs is in principle performed via the AP. If a direct link is set up between the STAs, the STAs can directly communicate with each other. An AP may also be referred to another terminology, such as a central controller, a Base Station (BS), a node-B, a Base Transceiver System (BTS), or a site controller.

A plurality of infrastructure BSSs including the BSS shown in FIG. 1 may be interconnected through a Distribution system (DS). The plurality of BSSs interconnected through the DS is called an Extended Service Set (ESS). An AP and/or an STA included in the ESS can communicate with each other. In the same ESS, an STA can move from one BSS to another BSS while performing seamless communication.

In a WLAN system according to the IEEE 802.11 standard, a basic access mechanism for Medium Access Control (MAC) is a Carrier Sense Multiple Access with Collision Avoidance (CSMA/CA) mechanism. The CSMA/CA mechanism is also called the Distributed Coordination Function (DCF) of IEEE 802.11 MAC. This mechanism basically adopts a "listen before talk" access mechanism. According to this type of an access mechanism, an AP and/or an STA senses a radio channel or a medium before starting transmission. If, as a result of the sense, the medium is determined to be in an idle state, the AP and/or the STA starts sending a frame through the medium. If, as a result of the sense, the medium is determined to be in an occupied state, the AP and/or the STA does not start transmission and sets delay time for accessing the medium and waits.

The CSMA/CA mechanism includes virtual carrier sensing in addition to physical carrier sensing in which an AP and/or an STA directly senses a medium. Virtual carrier sensing is for supplement a problem that may be generated when accessing a medium, such as a hidden node problem. For the virtual carrier sensing, the MAC layer of a WLAN system employs a Network Allocation Vector (NAV). The NAV is a value in which an AP and/or an STA now using a medium or having rights to use the medium instructs another AP and/or another STA to use the time remaining until the medium becomes available. Accordingly, the value set as the NAV corresponds to the period during which the use of the medium is scheduled by an AP or an STA or both which transmit a relevant frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

In the EDCA of the contention-based channel access scheme, frames having 8 kinds of user priorities are allowed for differential pieces of medium access. Each frame reaching the MAC layer from an upper layer has a specific user priority value, and the MAC header of each QoS data frame includes a user priority value.

In order to transmit the QoS data frame including the priorities, a QoS AP and/or a QoS STA implement 4 Access Categories (ACs). The user priority of a frame reaching the MAC layer is allocated one corresponding AC. Accordingly, if success is achieved in EDCA contention, an EDCA TXOP (transmission opportunity) is obtained. The TXOP is the time interval during which a specific STA has rights to initiate transmission through a radio medium. The TXOP is used to allocate some time during which a specific AP or a specific STA or both can transmit a frame and to guarantee the transmission of the frame. The transmission start time and the maximum transmission time of the TXOP are determined by an AP. In case of the EDCA TXOP, an STA may be informed of the TXOP through a beacon frame.

An EDCA parameter set (i.e., the core element of the EDCA scheme) is a field indicative of parameters for the traffic of a user priority. For example, the EDCA parameter set may be given as listed in Table 1. For the EDCA parameter set, reference can be made to Paragraph 7.3.2.29 of "IEEE 802.11n, Part 11: Wireless LAN Medium Access Control (MAC) and Physical Layer (PHY) Specifications, Amendment 5: Enhancements for Higher Throughput" disclosed on October 2009.

TABLE 1

| AC | CWmin | CWmax | AIFSN | TXOP limit |
|---|---|---|---|---|
| AC_BK | aCWmin | aCWmax | 7 | 0 |
| AC_BE | aCWmin | aCWmax | 3 | 0 |
| AC_VI | (aCWmin + 1)/2 − 1 | aCWmin | 2 | 3.008 ms |
| AC_VO | (aCWmin + 1)/4 − 1 | (aCWmin + 1)/2 − 1 | 2 | 1.504 ms |

Values, such as AIFSN[AC], CWmin[AC], and CWmax[AC] (i.e., the EDCA parameter set), may be carried on a beacon frame by an AP and may be informed to each STA. Basically, priorities become higher as the values AIFSN[AC] and CWmin[AC] are decreased. Accordingly, a greater band is used in a given traffic environment because channel access delay is shortened. As described above, a specific STA determines the transmission time based on the TXOP when starting transmission. An AP carries AIFSN[AC], CWmin[AC], and CWmax[AC] (i.e., EDCA parameters) and TXOP Limit [AC] (i.e., EDCA TXOP time) on a beacon frame and transfers the beacon frame to each STA.

The TXOP may be acquired by transmitting a probe response frame, exchanging an RTS (request to send) frame and a CTS (clear to send) frame, and transmitting a CTS to self frame. Information related to the TXOP may be broadcasted by an AP and may be included in EDCA parameter set information elements included in the above frames.

Unlike in the existing WLAN system, in the next-generation WLAN system, a higher throughput is required. This is called a VHT (Very High Throughput). To this end, the next-generation WLAN system is intended to support the transmission of an 80 MHz channel bandwidth, a contiguous 160 MHz bandwidth, and a non-contiguous 160 MHz channel bandwidth or higher. Furthermore, for a higher throughput, the next-generation WLAN system provides an MU-MIMO (Multi User-Multiple Input Multiple Output) transmission scheme. In the next-generation WLAN system, an AP can transmit a data frame to one or more MIMO-paired STAs at the same time. In a WLAN system, such as that shown in FIG. 1, an AP 10 can transmit data to an STA group, including one or more STAs among the STAs 21, 22, 23, 24 and 30 associated the AP 10, at the same time. Here, the data transmitted to the STAs may be transmitted through different spatial streams. The data frame transmitted by the AP 10 may be called a PPDU (Physical Layer Convergence Procedure (PLCP) Protocol Data Unit) which is generated in the Physical Layer (PHY) of the WLAN system and transmitted. In the examples of the present invention, it is assumed that a target transmission STA group MU-MIMO-paired with the AP 10 includes the STA1 21, the STA2 22, the STA3 23, and the STA4 24. In this case, data may not be transmitted to a specific STA of the target transmission STA group because a spatial stream is not allocated to the specific STA. Meanwhile, an STAa 30 may be associated with the AP 10, but it is assumed that the STAs 30 is not included in the target transmission STA group.

Figure 2:
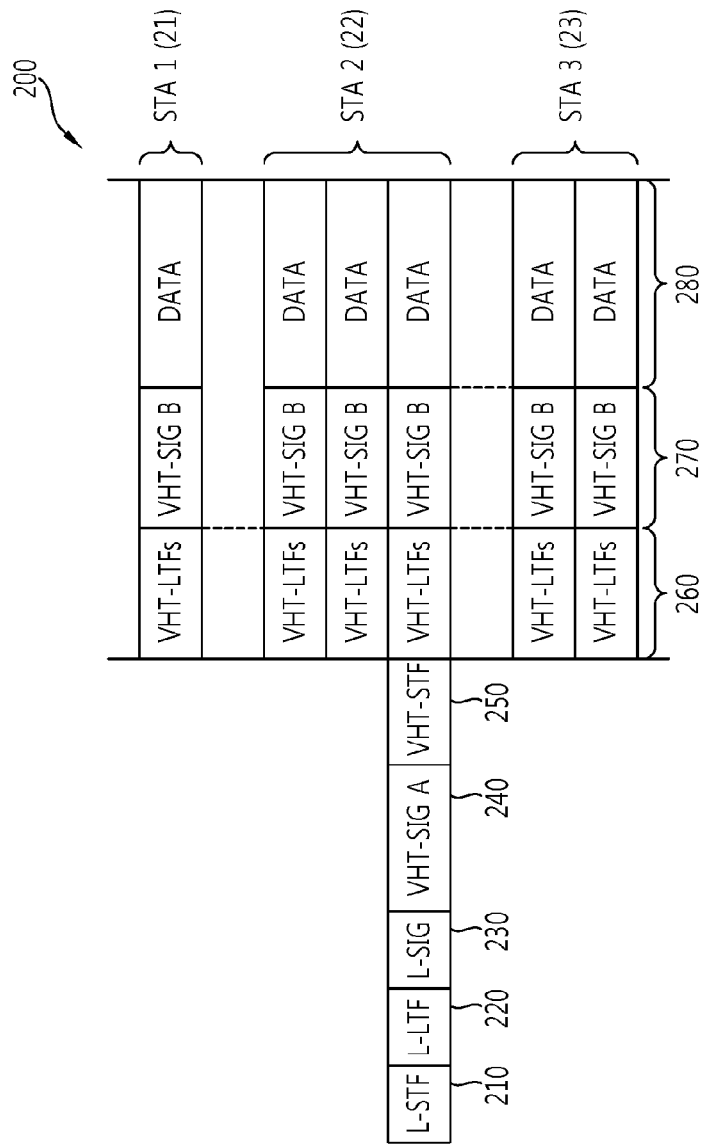
FIG. 2 is a block diagram showing an example of a format of a PPDU according to an embodiment of the present invention.

FIG. 2 is a block diagram showing an example of a format of a PPDU 200 according to an embodiment of the present invention.

Referring to FIG. 2, the PPDU 200 may include an L-STF field 210, an L-LTF field 220, an L-SIG field 230, a VHT-SIG A field 240, a VHT-STF field 250, VHT-LTF fields 260, VHT-SIG B fields 270, and a data field 280.

A PLCP sublayer constituting the PHY layer adds necessary information to a PHY Service Data Unit (PSDU) received from an MAC (Medium Access Control) layer, converts the PSDU into the data field 280, generates the PPDU 200 by adding the L-STF field 210, the L-LTF field 220, the L-SIG field 230, the VHT-SIG A field 240, the VHT-STF field 250, the VHT-LTF fields 260, and the VHT-SIG B fields 270 to the data field 280, and transmits them to one or more STAs through a Physical Medium Dependent (PMD) sublayer constituting the PHY layer.

The L-STF field 210 is used for frame timing acquisition, Automatic Gain Control (AGC) convergence, coarse frequency acquisition, and so on.

The L-LTF field 220 is used to estimate a channel for demodulating the L-SIG field 230 and the VHT-SIG A field 240.

An L-STA uses the L-SIG field 230 to receive the PPDU 200 and to obtain data.

The VHT-SIG A field 240 is a field related to common control information necessary for STAs MIMO-paired with an AP. The VHT-SIG A field 240 includes control information for interpreting the received PPDU 200. The VHT-SIG A field 240 includes information about a spatial stream, bandwidth information, and ID information regarding whether each of a plurality of MIMO-paired STAs uses Space Time Block Coding (STBC) for each of the plurality of MIMO-paired STAs, a group identifier (i.e., ID information about a target transmission STA group), information about a spatial stream allocated to an STA included in a target transmission group STA indicated by a group identifier, and information related to a short Guard Interval (GI) of a target transmission STA. Here, the group identifier may include information regarding whether an MIMO transmission scheme now being used is an MU-MIMO transmission scheme or an single user (SU) MIMO transmission scheme.

The VHT-STF field 250 is used to improve the performance of AGC estimation in the MIMO transmission scheme.

The VHT-LTF fields 260 are used for an STA to estimate an MIMO channel. Since the next-generation WLAN system supports the MU-MIMO transmission scheme, the VHT-LTF fields 260 may be set as many as the number of spatial streams in which the PPDU 200 is transmitted. In addition, if full channel sounding is supported and performed, the number of VHT LTF fields may be increased.

The VHT-SIG B field 270 includes dedicated control information which is necessary for a plurality of MIMO-paired STAs to receive the PPDU 200 and to acquire data. Accordingly, only when the common control information included in the VHT-SIG A field 240 indicates that the PPDU 200 now received has been transmitted according to the MU-MIMO transmission scheme, an STA can be designed to receive the VHT-SIG B fields 270. On the other hand, if the common control information indicates that the PPDU 200 now received is for a single STA (including the SU-MIMO transmission scheme), an STA may be designed not to decode the VHT-SIG B fields 270.

The VHT-SIG B field 270 includes information about the modulation, encoding, and rate-matching of each STA. The size of the VHT-SIG B field 270 may be different according to the type (MU-MIMO or SU-MIMO) of MIMO transmission and a channel bandwidth used to transmit a PPDU.

The data fields 280 include data intended to be transmitted to an STA. The data field 280 include a service field for resetting a PLCP Service Data Unit (PSDU) to which a MAC Protocol Data Unit (MPDU) in the MAC layer has been transmitted and a scrambler, a tail field including a bit sequence necessary to return a convolution encoder to a zero state, and padding bits for standardizing the length of a data field.

Meanwhile, in a WLAN system, such as that shown in FIG. 1, STAs associated with an AP may have different channel bandwidth capabilities. Here, the simplest method in which the AP can transmit data to the plurality of STAs according to the MU-MIMO transmission scheme is to include information, indicating a channel bandwidth to be used for transmission, in the VHT-SIG B field of a PPDU format, such as that shown in FIG. 2. In this case, each STA can know the channel bandwidth of a PPDU transmitted thereto by decoding the VHT-SIG B field.

If a PPDU format, such as that shown in FIG. 2, is used, a channel bandwidth is included in the VHT-SIG A field 240 and transmitted. In this case, a plurality of STAs having different channel bandwidth capabilities can know a common channel bandwidth. In a WLAN system environment in which a plurality of STAs having different channel bandwidth capabilities coexists as described above, a method of efficiently transmitting the PPDU during the TXOP period according to the MU-MIMO transmission scheme needs to be discussed.

Figure 3:
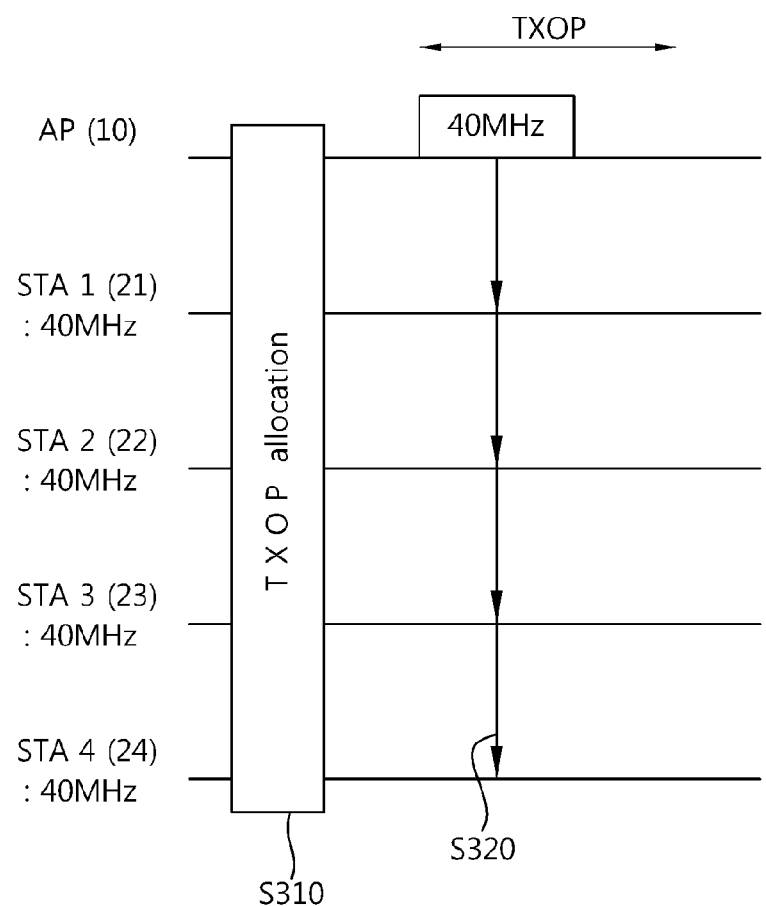
FIG. 3 is a diagram showing an example of a method of transmitting PPDUs according to an embodiment of the present invention.

FIG. 3 is a diagram showing an example of a method of transmitting the PPDU according to an embodiment of the present invention.

Referring to FIG. 3, the AP and the plurality of MU-MIMO-paired STAs 21, 22, 23, and 24 have the same channel bandwidth capability of 40 MHz. Since all the STAs have the same channel bandwidth capability, data can be efficiently transmitted according to the MU-MIMO transmission scheme using channel bandwidth information included in the VHT-SIG A field of the PPDU.

A TXOP is allocated to the STAs 21, 22, 23, and 24 associated with the AP 10 at step S310. The allocation of the TXOP may be performed when information related to the TXOP acquired by the AP 10 is transmitted to the STAs. The information related to the TXOP may be included in a beacon frame or a probe response frame and broadcasted. Furthermore, the TXOP may be allocated by exchanging an RTS (Request to Send) frame and a CTS (Clear to Send) frame. Here, a channel bandwidth available within the TXOP period may be determined according to a channel bandwidth parameter value included in the CTS frame.

When transmitting the PPDU within the TXOP period, the AP 10 sets the channel bandwidth information of the VHT-SIG A field so that it indicates 40 MHz and transmits the PPDU to the plurality of STAs according to the MU-MIMO transmission scheme at step S320. The STAs 21, 22, 23, and 24 can check a channel bandwidth value used to transmit data included in the PPDU based on the channel bandwidth information included in the received PPDU and thus can receive data. This method may also apply to a case where the channel bandwidth capability of an STA is an 80 MHz channel bandwidth, a contiguous 160 MHz channel bandwidth, or a non-contiguous 160 MHz channel bandwidth. A channel bandwidth matched with the PPDU transmitted by the AP 10A may have any value smaller than the channel bandwidth capability.

Unlike in FIG. 3, the AP and the MU-MIMO-paired STAs may have different channel bandwidth capabilities. In the case where a PPDU having a format, such as that shown in FIG. 2, is transmitted, the STAs may not be informed of different channel bandwidths because channel bandwidth information is included in the VHT-SIG A field and transmitted. Accordingly, the AP includes the channel bandwidth information in the VHT-SIG A field, transmits the PPDU including the VHT-SIG A field, and transmits the PPDU to each STA which can receive the PPDU. This is described in detail with reference to FIG. 4.

Figure 4:
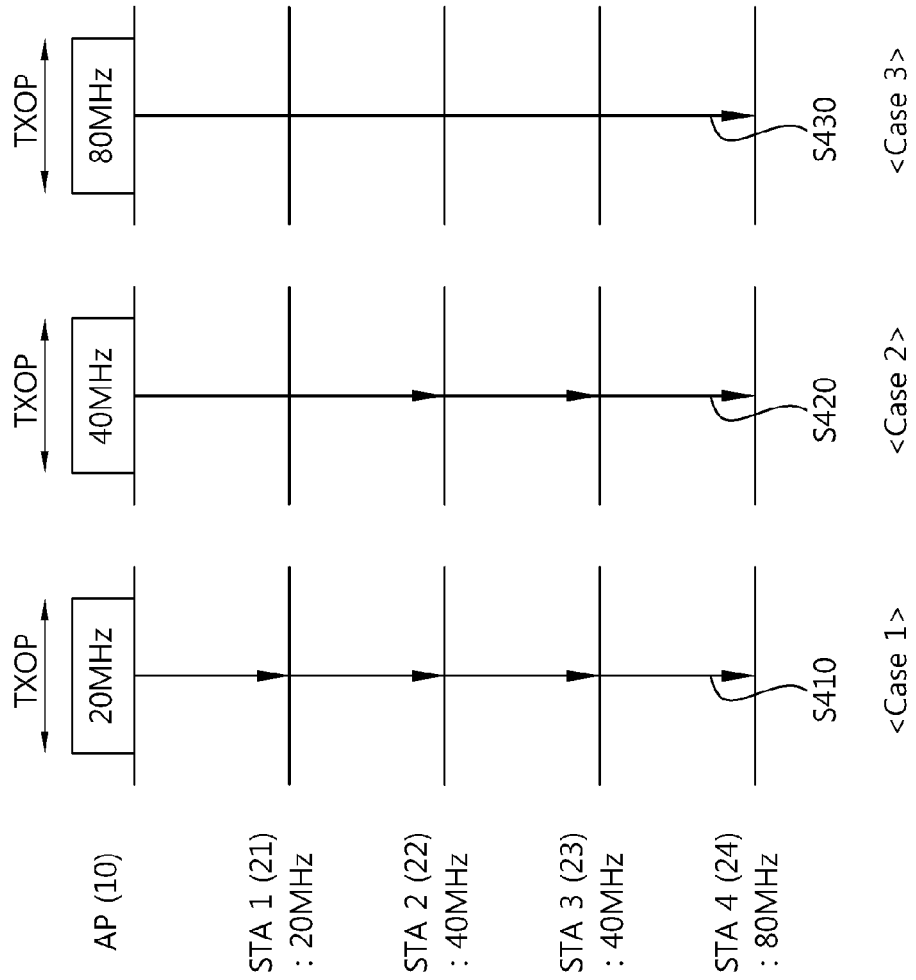
FIG. 4 is a diagram showing another example of a method of transmitting PPDUs according to an embodiment of the present invention.

FIG. 4 is a diagram showing another example of a method of transmitting PPDUs according to an embodiment of the present invention.

Referring to FIG. 4, the AP 10 and the plurality of MU-MIMO-paired STAs 21, 22, 23, and 24 have different channel bandwidth capabilities, and the different channel bandwidth capabilities may not have the same value.

TXOPs are allocated to the STAs 21, 22, 23, and 24 associated with the AP 10. The allocation of the TXOP may be performed when pieces of information related to the TXOP acquired by the AP 10 are transmitted to the STAs. The information related to TXOP is included in a beacon frame or a probe response frame and then broadcasted. Furthermore, the TXOP may be allocated by exchanging an RTS (Request to Send) frame and a CTS (Clear to Send) frame. Here, a channel bandwidth available within the TXOP period may be determined according to a channel bandwidth parameter value included in the CTS frame.

In Case 1, the AP 10 can transmit a PPDU having a 20 MHz channel bandwidth within a TXOP period at step S410. All the STA1 21, the STA2 22, the STA3 23, and the STA4 24 have a channel bandwidth capability of a 20 MHz channel bandwidth or wider. Accordingly, the AP 10 can transmit the PPDU to all the paired STAs. If it is not the case where there is no data to be transmitted to a specific STA, a specific number of spatial streams can be allocated to each of the STAs, and each of the STAs can receive the PPDU through relevant spatial streams.

In Case 2, the AP 10 can transmit a PPDU having a 40 MHz channel bandwidth within a TXOP period at step S420. Here, the STA1 21 cannot receive relevant data because it has a 20 MHz channel bandwidth capability. Accordingly, the AP 10 transmits data to the remaining STAs other than the STA1 21. This method may be implemented in such a manner that a group ID indicates a target transmission STA group including the STA1 to the STA4, but the number of spatial streams used to transmit data to the STA1 121 is set to 0.

In Case 3, the AP 10 can transmit a PPDU having an 80 MHz channel bandwidth within a TXOP period at step S430. Here, the STA1 21 and the STA2 22 and the STA3 23 cannot receive relevant data because the STA1 21 has a 20 MHz channel bandwidth capability and the STA2 22 and the STA3 23 have a 40 MHz channel bandwidth capability. Accordingly, the AP 10 transmits data to only the STA4 24. This method may be implemented in such a manner that a group ID indicates a target transmission STA group including the STA1 to the STA4, but the number of spatial streams used to transmit data to the STA1 21, the STA2 22, and the STA3 23 is set to 0.

As described above, the number of target transmission STAs to which an AP can transmit data according to the MU-MIMO transmission scheme is changed according to the channel bandwidth capabilities of STAs included in a target transmission STA group. To this end, another method of transmitting data to a plurality of STAs having different channel bandwidth capabilities may be provided.

Figure 5:
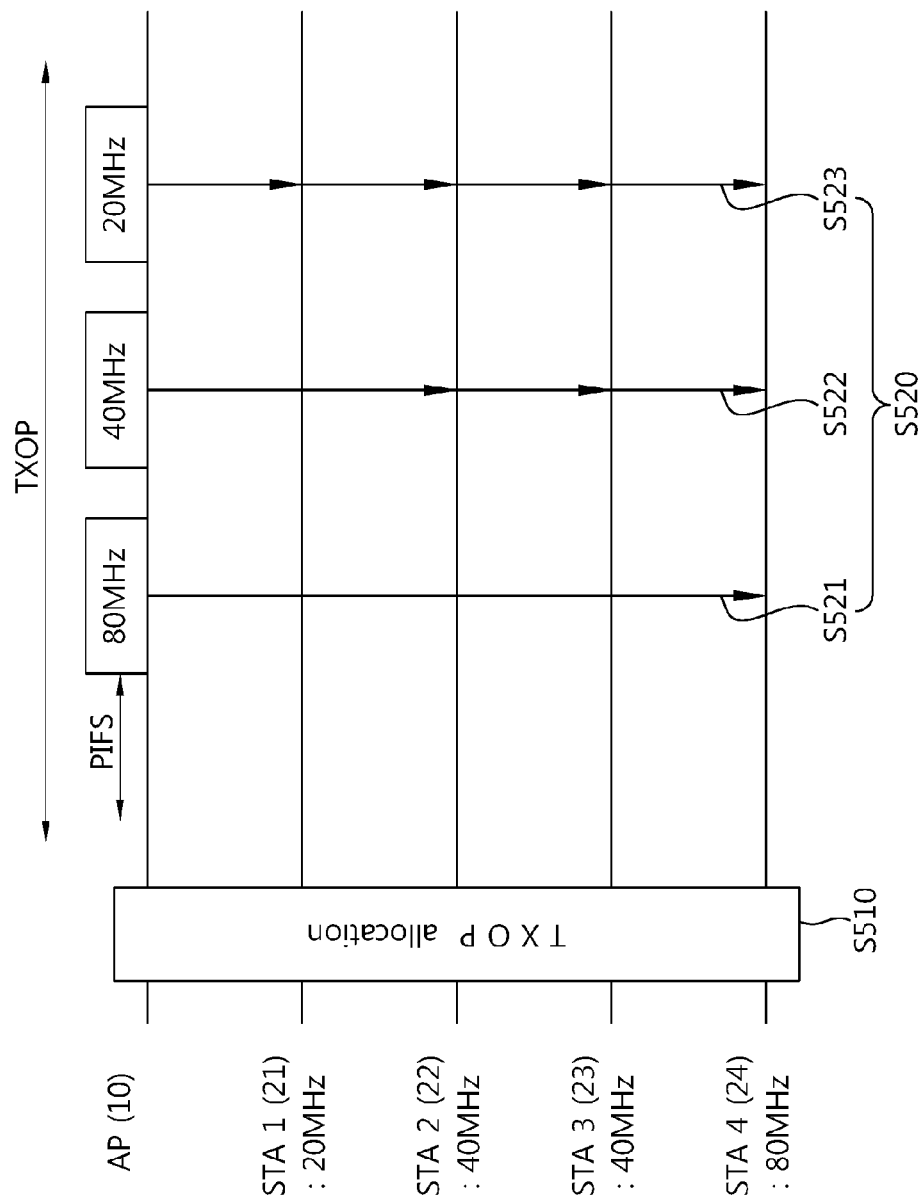
FIG. 5 is a diagram showing yet another example of a method of transmitting PPDUs according to an embodiment of the present invention.

FIG. 5 is a diagram showing yet another example of a method of transmitting PPDUs according to an embodiment of the present invention.

Referring to FIG. 5, the AP 10 and the plurality of MU-MIMO-paired STAs 21, 22, 23, and 24 have respective channel bandwidth capabilities, and the channel bandwidth capabilities may not have the same value.

TXOPs are allocated to the STAs 21, 22, 23, and 24 associated with the AP 10 at step S510. The allocation of the TXOPs may be performed when pieces of information related to the TXOPs acquired by the AP 10 are transmitted to the STAs. The information related to the TXOPs may be included in a beacon frame or a probe response frame and then broadcasted. Furthermore, the TXOPs may be allocated by exchanging a Request to Send (RTS) frame and a Clear to Send (CTS) frame. Here, a channel bandwidth available within the TXOP period may be determined according to a channel bandwidth parameter value included in the CTS frame. More particularly, the channel bandwidth available within the TXOP period may be determined from information parameter obtained by interpreting the CTS frame received. The value set in the channel bandwidth parameter for the CTS frame may be same or smaller than that a set in the channel bandwidth for the RTS frame and may be transmitted through a channel bandwidth indicated by a parameter corresponding to the CTS frame. If the channel bandwidth available within the TXOP period is greater than a 20 MHz channel bandwidth, an AP and/or a STA can transmit a PPDU several times using a bandwidth which is smaller than or equal to the channel bandwidth available within the TXOP period. In the following embodiments, it is assumed that a channel bandwidth for a TXOP is 80 MHz.

The AP 10 transmits PPDUs to the plurality of MU-MIMO-paired STAs within the TXOP period at step S520. The VHT-SIG A field transmitted by the AP 10 includes channel bandwidth information. The same channel bandwidth is allocated to all the STAs based on the VHT-SIG A field. When transmitting the PPDUs to the plurality of MU-MIMO-paired STAs within the TXOP period, the AP 10 transmits a PPDU suitable for the channel bandwidth capability of each STA. Here, the AP 10 may divide the transmission period into periods and transmit PPDUs matched with different channel bandwidths.

When the TXOP is set between the AP 10 and the STAs 21, 22, 23, and 24, data, control and management frames, etc. can be freely transmitted and received without a new contention during a specific period. First, the AP 10 transmits the PPDU, including channel bandwidth information indicative of the 80 MHz channel bandwidth in the VHT-SIG A field, to the STA4 24 at step S521. Next, the AP 10 transmits the PPDU, including channel bandwidth information indicative of a 40 MHz channel bandwidth in the VHT-SIG A field, to the STA2 22, the STA3 23, and the STA4 24 at step S522. Next, the AP 10 transmits the PPDU, including channel bandwidth information indicative of a 20 MHz channel bandwidth in the VHT-SIG A field, to the STA1 21, the STA2 22, the STA3 23, and the STA4 24 at step S523. That is, the AP 10 can adapt a plurality of channel bandwidth to be transmitted according to channel bandwidth capabilities of each of the MU-MIMO-paired STAs.

After all data intended to be transmitted to the STA4 24 is transmitted to the STA4 24 through 80 MHz PPDU transmission when a channel bandwidth is adapted through multiple channel bandwidth transmission performed within the TXOP period, a PPDU needs not to be transmitted to the STA4 24. Accordingly, the 40 MHz PPDU may be transmitted to only the STA2 22 and the STA3 23. Likewise, after all data intended to be transmitted to the STA2 22 and the STA3 23 is transmitted to the STA2 22 and the STA3 23 through the 40 MHz PPDU transmission step, a PPDU needs not to be transmitted to the STA2 22 and STA3 23. Accordingly, the 20 MHz PPDU may be transmitted to only the STA1 21.

What the AP 10 transmits the PPDUs to some of the plurality of MU-MIMO-paired STAs may be specified by a group ID and information indicative of the number of spatial streams allocated thereto. In a WLAN system, such as that shown in FIG. 5, in the case where a group ID indicates an STA group including an STA1, STA2, STA3 and STA4, when the number of spatial streams allocated to a specific STA is set to 0, data is not transmitted to the specific STA. It means that a PPDU is not normally transmitted to a specific STA, but means that the PPDU can be transmitted to the other specific STAs of the STA group indicated by the group ID.

In the case where an AP performs multiple channel bandwidth transmission using different channel bandwidths within the TXOP period as shown in FIG. 5, a channel bandwidth used to transmit a PPDU must be same or narrower than a channel bandwidth used for a preceding PPDU transmitted. That is, there is proposed a method of adapting the bandwidth from a wider channel bandwidth to a narrower channel bandwidth. When setting the TXOP, a Network Allocation Vector (NAV) is set in the remaining STAs other than an STA MU-MIMO-paired with the AP, and thus the PPDU is not transmitted to the remaining STAs. The STAa (i.e., an STA operating in a doze state) does not recognize the NAV. Consequently, the remaining subchannels may be used by the STAa because the remaining subchannels remain in an idle state during which the AP transmits the 20 MHz PPDU. In this case, since the AP does not perform a Clear Channel Assessment (CCA) measure within the TXOP period, a collision may occur if the AP finishes the 20 MHz PPDU transmission and transmits the 40 MHz PPDU or the 80 MHz PPDU or both.

When the above channel bandwidth adaptation is applied, a PPDU having the greatest channel bandwidth is first transmitted as in the embodiment shown in FIG. 5. Referring back to FIG. 5, the AP 10 first transmits the PPDU having the 80

MHz channel bandwidth and then transmits the PPDUs having the 40 MHz and the 20 MHz channel bandwidths.

Here, the AP has to check whether the channel band is in an idle state before transmitting the first PDPU within the TXOP period. For example, if the 80 MHz channel is determined to be idle within the TXOP period, the AP does not need to perform a CCA measure for the subsequent 80 MHz, 40 MHz, and 20 MHz channel bandwidths and may transmit the PPDUs in order of the 80 MHz, 40 MHz, and 20 MHz channel bandwidths. If a maximum channel bandwidth supported by a WLAN system is further increased, the CCA measure may be performed according to a relevant channel bandwidth.

To this end, the AP performs the CCA measure based on a PPDU value having the greatest channel bandwidth, from among PPDUs to be transmitted. In an embodiment for PPDU transmission, such as that shown in FIG. 5, the CCA measure regarding whether the 80 MHz channel bandwidth is available is performed. If the CCA measure for the greatest channel bandwidth is not first performed, a CCA measure according to a relevant channel bandwidth has to be performed before a PPDU is transmitted to the relevant channel bandwidth. However, the CCA measure is not performed within the TXOP period as a general rule. This is an advantage of the PPDU transmission/reception scheme accompanied by TXOP allocation. This is described with reference to FIG. 6.

Figure 6:
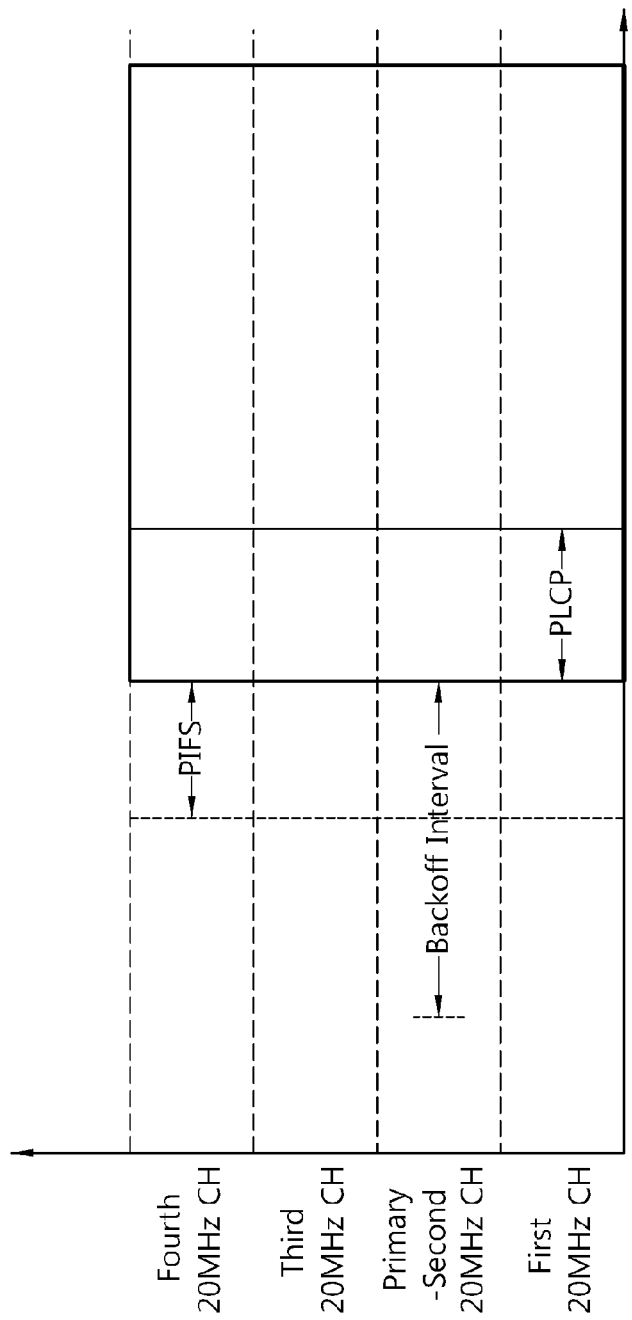
FIG. 6 is a diagram showing a CCA measure example which may be applied to an embodiment of the present invention.

FIG. 6 is a diagram showing a CCA measure example which may be applied to an embodiment of the present invention.

Referring to FIG. 6, an AP checks whether frequency bands are idle while performing a CCA measure for a primary channel during a backoff interval. At the same time, the AP performs a CCA measure for an 80 MHz channel bandwidth during a Point InterFrame Space (PIFS) before transmitting a PPDU. If, as a result of the CCA measure, all the channels of the 80 MHz channel bandwidth are idle during the PIFS, the AP can transmit a PPDU having the 80 MHz channel bandwidth.

In a multiple bandwidth transmission scheme in which an AP transmits PPDUs several times by using different channel bandwidths during a TXOP period, the existing Short InterFrame Space (SIFS) and the existing Reduced InterFrame Space (RIFS) may be applied to an InterFrame Space (IFS) when the PPDUs are transmitted.

Figure 7:
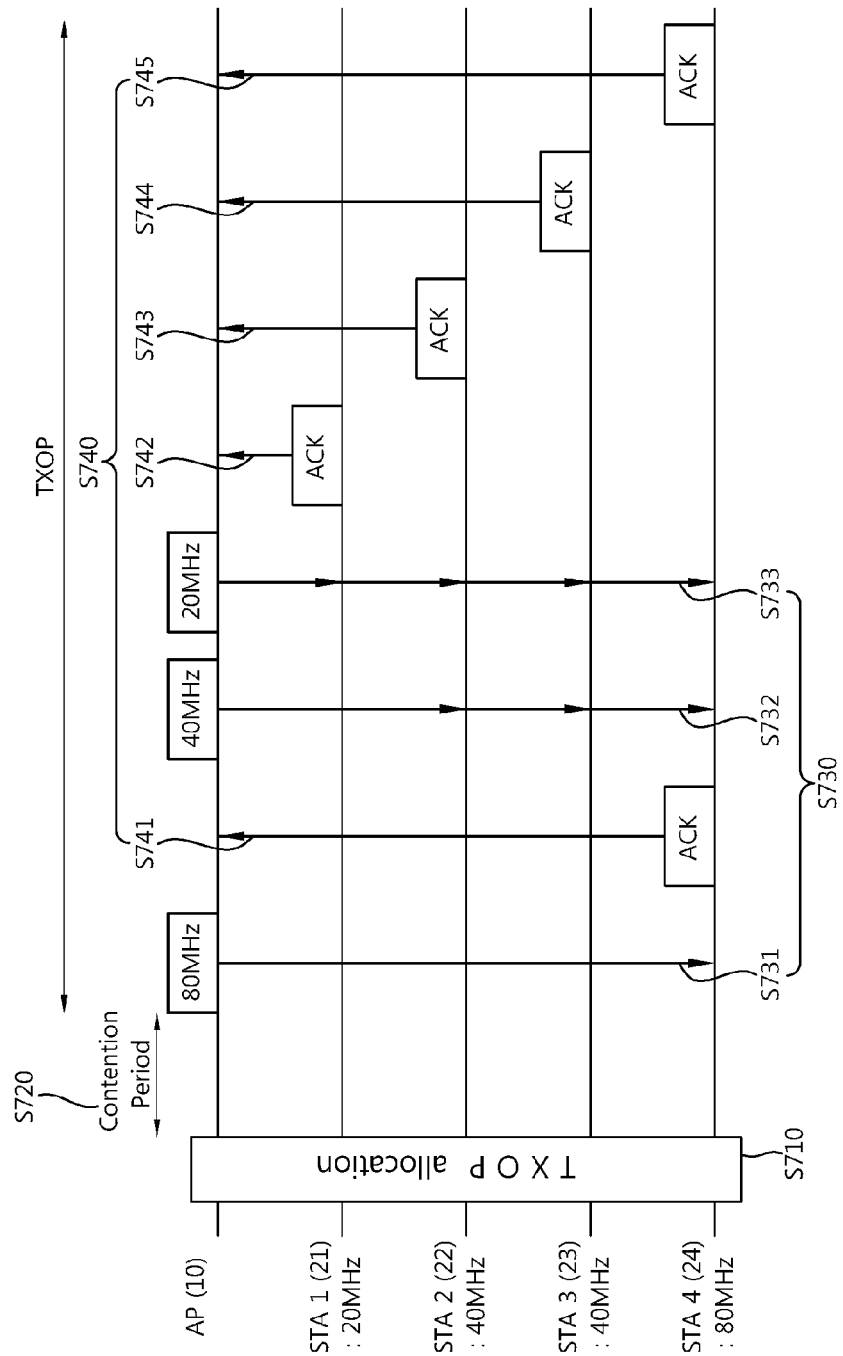
FIG. 7 is a flowchart illustrating a method of transmitting PPDUs according to an embodiment of the present invention.

FIG. 7 is a flowchart illustrating a method of transmitting PPDUs according to an embodiment of the present invention.

Referring to FIG. 7, TXOPs are allocated to the STAs 21, 22, 23, and 24 associated with the AP 10 at step S710. The allocation of the TXOPs may be performed when pieces of information related to the TXOPs acquired by the AP 10 are transmitted to the STAs. The information related to TXOP may be included in a beacon frame or a probe response frame and then broadcasted. The TXOPs may be allocated like in step S510 according to the embodiment described with reference to FIG. 5.

The AP 10 checks whether an 80 MHz channel is idle during a contention period at step S720 and then transmits PPDUs during a TXOP period at step S730. The AP 10 transmits the PPDUs to the STAs 21, 22, 23, and 24. Here, the STAs 21, 22, 23, and 24 transmit respective acknowledgement frames ACK in response to the PPDUs received from the AP 10 at step S740). The acknowledgement frame may be a concept including a block acknowledgement frame. The procedure of the AP 10 transmitting the PPDUs to the STA group (21, 22, 23, and 24) transmitting the acknowledgement frames is described below.

The AP 10 first transmits an 80 MHz PPDU to the STA4 24 at step S731. When the PPDU is successfully received, the STA4 24 transmits the acknowledgement frame to the AP 10 at step S741. Next, the AP 10 transmits an 40 MHz PPDU to the STA2 22, the STA3 23, and the STA4 24 at step S732. Meanwhile, the STA2 22, the STA3 23, and the STA4 24 may transmit the respective acknowledgement frames in response to the 40 MHz PPDU, but the AP 10 may transmit the remaining 20 MHz PPDU to the STA1 21, the STA2 22, the STA3 23, and the STA4 24 before the acknowledgement frames are received at step S733. After the 20 MHz PPDU is received, the STA1 21 transmits the acknowledgement frame to the AP 10 in response to the 20 MHz PPDU at step S742. The STA2 22, the STA3 23, and the STA4 24 transmit respective block acknowledgements to the AP 10 in response to the 40 MHz PPDU and the 20 MHz PPDU at steps S743, S744, and S745. The sequence that the STAs transmits the respective acknowledgement frames is not limited to that shown in FIG. 7 and may be randomly determined according to a channel access mechanism which is provided by a WLAN system for transmitting acknowledgement frames.

Figure 8:
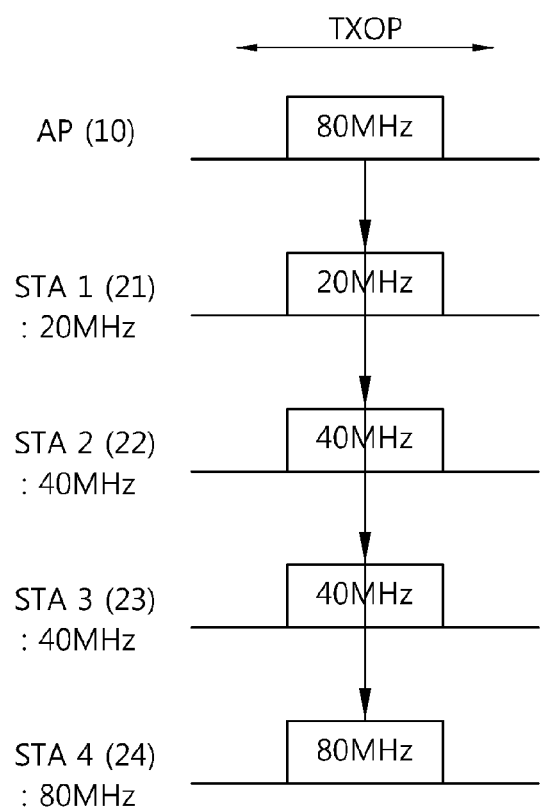
FIG. 8 is a flowchart illustrating a method of transmitting PPDUs according to another embodiment of the present invention.

FIG. 8 is a flowchart illustrating a method of transmitting PPDUs according to another embodiment of the present invention. An STA cannot receive data which is transmitted through a wider bandwidth than its channel bandwidth capability, but may disregard a bandwidth indicated by channel bandwidth information included in a PPDU and receive data on the basis of its channel bandwidth capability.

Referring to FIG. 8, the AP 10 transmits PPDUs to the plurality of STAs STA1 21, STA2 22, the STA3 23, and the STA4 24 during a TXOP period allocated thereto. Here, the VHT-SIG A field of the PPDU includes bandwidth information indicative of an 80 MHz channel bandwidth. Furthermore, data matched with a bandwidth according to a relevant channel bandwidth capability is transmitted to each of the STAs. Accordingly, the AP transmits a 20 MHz PPDU to the STA1 21, a 40 MHz PPDU to the STA2 22 and the STA3 23, and the 80 MHz PPDU to the STA4 24.

Each of the STAs can receive data by using a channel bandwidth, indicated by channel bandwidth information included in the VHT-SIG A field of the PPDU, and a channel bandwidth for data transmission, having a smaller bandwidth from a maximum usable channel bandwidth according to its channel bandwidth capability.

There is a need for a rule for determining a channel bandwidth in order for an STA to receive a PPDU and to receive data on the basis of its channel bandwidth capability as described above. For example, an STA may be set to determine a smaller value of a signaled channel bandwidth and a maximum usable channel bandwidth as a channel bandwidth to be used. Here, the signaled channel bandwidth may be a value indicated by channel bandwidth information which is included in the VHT-SIG A field of a PPDU transmitted by an AP.

The maximum usable channel bandwidth may correspond to the channel bandwidth capability value of a relevant STA and may be a value that is transmitted from the STA to the AP when the STA is associated with the AP. Furthermore, the maximum usable channel bandwidth may be determined based on channel bandwidth information included in a management action frame informing the operating mode of an STA. Table 2 below shows a format of an operating mode notification frame including channel bandwidth information.

TABLE 2

| Order | Information |
| --- | --- |
| 1 | Category |
| 2 | Action |
| 3 | Channel width |

The category field is set to a value indicating that a relevant frame can be used in the next-generation WLAN system supporting the VHT. The action field is set to a value indicating that a relevant frame is an operating mode notification frame. The channel width field includes channel bandwidth information. Table 3 below shows a format of a channel bandwidth field.

TABLE 3

| Value | Meaning |
| --- | --- |
| 0 | 20 MHz |
| 1 | 40 MHz |
| 2 | 80 MHz |
| 3 | 160 MHz or 80 + 80 MHz |
| Other | reserved |

An STA can transmit the operating mode notification frame to another STA or another AP or both. The operating mode notification frame is used to restrict the channel bandwidth of a PPDU which is transmitted from another STA or another AP or both to a specific STA. For example, if an AP wants to receive a 20 MHz PPDU, the AP may broadcast the operating mode notification frame to STAs within a BSS. If the AP broadcasts a channel width set to 0, the STAs within the BSS performs transmission using the 20 MHz PPDU. The same is true when the STA broadcasts the relevant frame.

When an AP transmits 20 MHz, 40 MHz, and 80 MHz PPDUs based on the channel bandwidth capabilities of STAs, the AP needs to take the orthogonalities and positions of pilot sequences into consideration.

Figure 9:
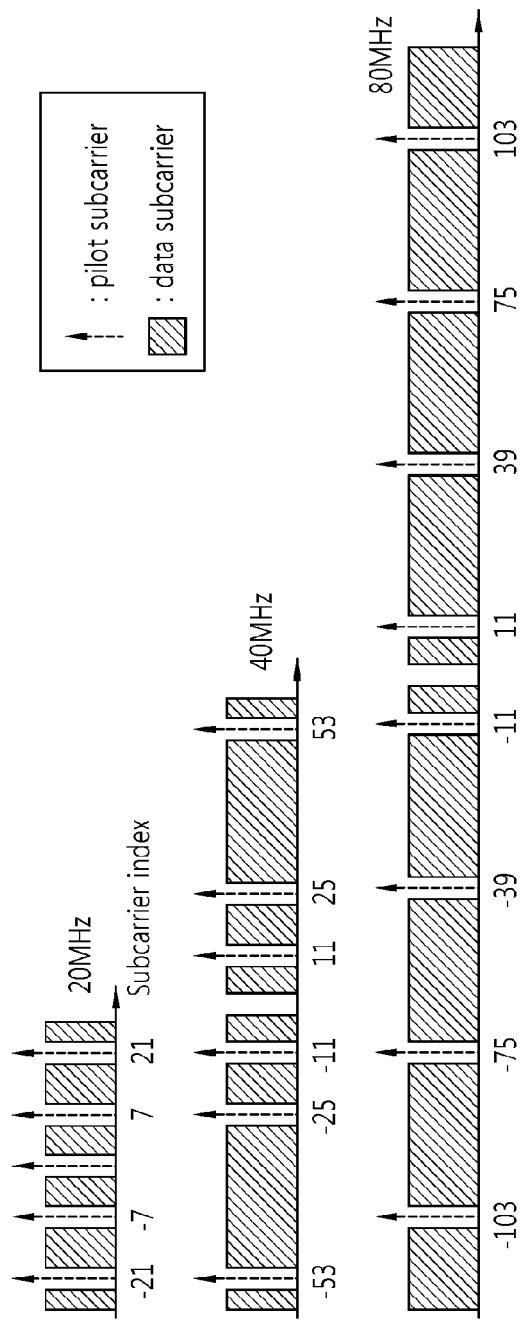
FIG. 9 shows an example of the allocation of pilot sequences according to channel bandwidths.

First, the pilot sequences respectively forming the 20 MHz, 40 MHz, and 80 MHz channel bandwidths may not be orthogonal to each other. Second, the subcarrier positions of the pilot sequences may not be accurately matched with each other. That is, in different bandwidths, orthogonality in a subcarrier in which a data tone and a pilot tone overlap with each other cannot be guaranteed. In order to guarantee the orthogonal property of the data tone and the pilot tone, the data tone may be changed into a null data tone. FIG. 9 shows an example of the allocation of pilot sequences according to channel bandwidths. When a data tone overlapping with a pilot tone is allocated as a null data tone, orthogonality can be guaranteed.

Meanwhile, if it is an environment in which PPDU transmission according to the MU-MIMO transmission scheme can obtain a proper gain, an AP would have already transmitted PPDUs to respective STA by properly performing beamforming. That is, although channel bandwidths used to transmit data from the AP to the respective STAs are different, interference therebetween is small. In this case, as described above, although pilot tones are not orthogonal to each other, the entire MU-MIMO transmission performance may not be greatly influenced.

Figure 10:
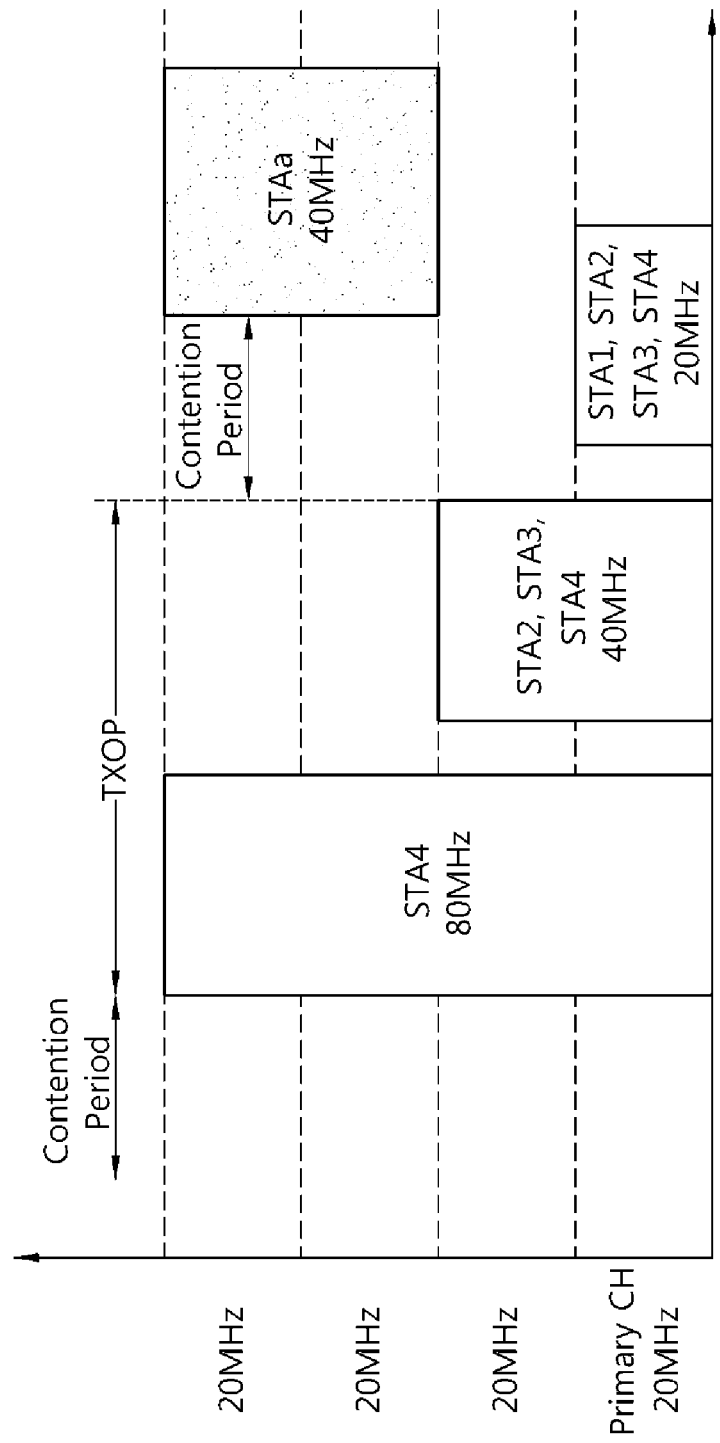
FIGS. 10 and 11 are diagrams illustrating examples in which channels applicable to embodiments of the present invention are used.
Figure 11:
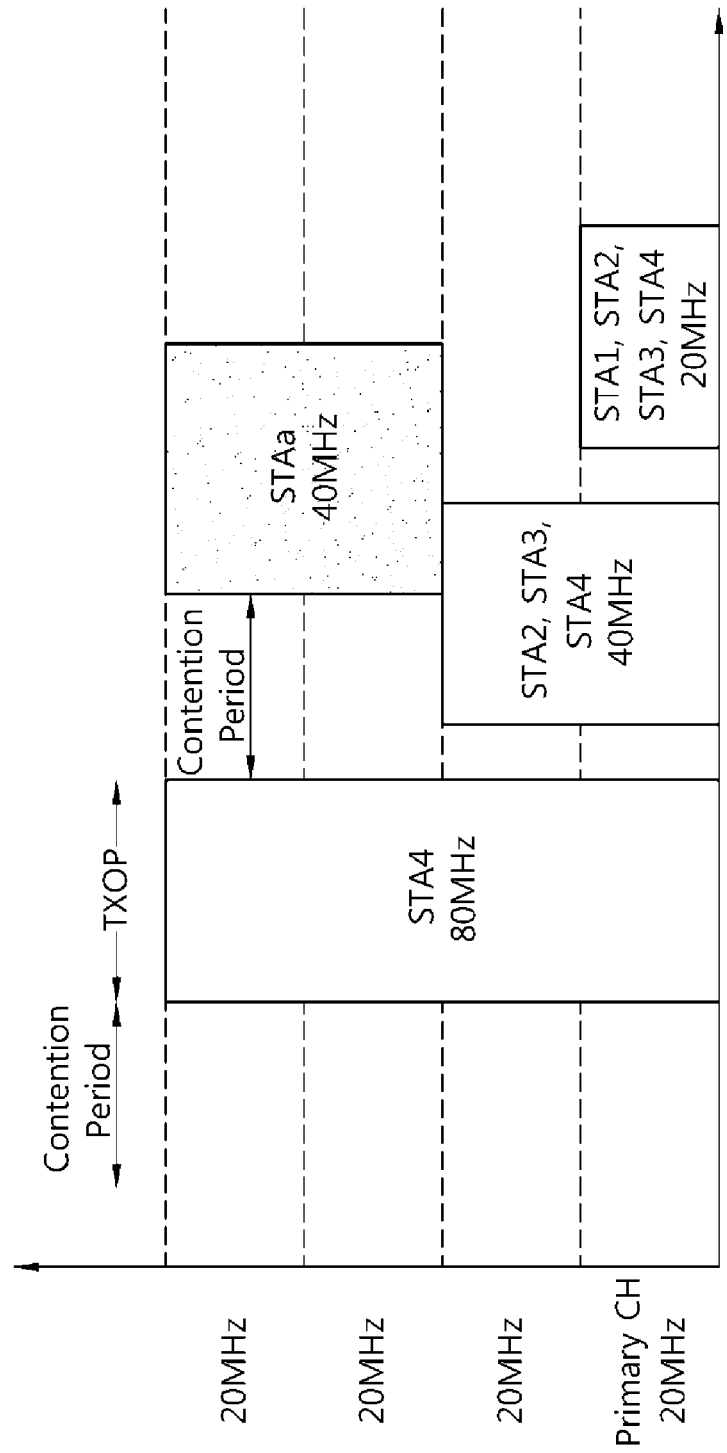

FIGS. 10 and 11 are diagrams illustrating examples in which channels applicable to the embodiments of the present invention are used.

Assuming that a TXOP period is once set to an 80 MHz channel bandwidth, the AP transmits PPDUs to the STAs STAs 1, 2, 3, and 4 through multiple bandwidth transmission. Although the AP transmits a 40 MHz PPDU or a 20 MHz PPDU after transmitting the entire 80 MHz PPDU, other terminals cannot use redundant subchannels. In order for other terminals to have opportunities to access the subchannels of an idle state, the TXOP period may be set to a PPDU transmission period up to a specific channel bandwidth.

Referring to FIG. 10, the TXOP period is set to a period during which the 80 MHz PPDU is transmitted to the STA4 24 and the 40 MHz PPDU is transmitted to the STA2 22, the STA3 23, and the STA4 24. The STAa not included in the target STA group to which the PPDUs transmitted by the AP 10 will be transmitted may perform a contention mechanism after the 80 MHz PPDU and the 40 MHz PPDU are transmitted in the TXOP period, access a channel, and then transmit and receive a relevant PPDU. The contention mechanism may be differently performed according to a channel bandwidth to be used by the STAa. The STAa can transmit and receive the relevant PPDU using the bandwidth within a channel bandwidth having an idle state checked through the contention mechanism.

Referring to FIG. 11, a TXOP period is set to a period during which an 80 MHz PPDU is transmitted to the STA4 24. The STAa may perform a contention mechanism after the 80 MHz PPDU is transmitted in the TXOP period, access a channel, and then transmit and receive a relevant PPDU. The contention mechanism may be differently performed according to a channel bandwidth to be used by the non-AP STAa. The STAa can transmit and receive the relevant PPDU using the bandwidth within a channel bandwidth having an idle state checked through the contention mechanism.

Figure 12:
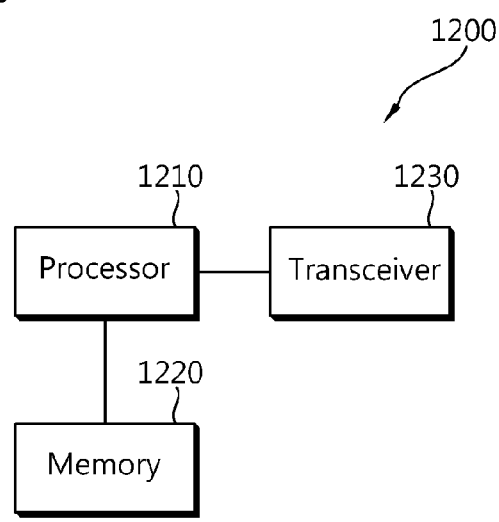
FIG. 12 is a block diagram showing a wireless apparatus in which the methods of transmitting PPDUs according to the embodiments of the present invention may be implemented.

FIG. 12 is a block diagram showing a wireless apparatus in which the methods of transmitting PPDUs according to the embodiments of the present invention may be implemented.

Referring to FIG. 12, the wireless apparatus 1200 includes a processor 1210, memory 1220, and a transceiver 1230. The transceiver 1230 transmits and/or receives a radio signal and implements the physical layer of the IEEE 802.11 standard. The processor 1210 is functionally connected to the transceiver 1230 and is set to implement the MAC layer or the PHY layer or both for implementing the embodiments of the present invention shown in FIGS. 2 to 11, in which a data frame, such as a PPDU format, is generated, a transmission channel is selected, and the data frame is transmitted through the transmission channel. The processor 1210 and/or the transceiver 1230 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1220 and may be performed by the processor 1210. The memory 1220 may be located inside or outside the processor 1210, and may be coupled to the processor 1210 by using various well-known means.

The invention claimed is:

1. A method of transmitting a data frame by a transmitter in a wireless local area network, the method comprising:
obtaining, by the transmitter, a transmission opportunity (TXOP) for a bandwidth, the TXOP indicating a interval of time when the transmitter has a right to exchange frame sequences;
if a specific condition in the TXOP is determined by the transmitter to have been met, setting, by the transmitter, a transmit bandwidth parameter of a non-initial data unit of a plurality of data units to be the same or narrower than a transmit bandwidth parameter of a preceding data unit of the plurality of data units; and transmitting, by the transmitter during the TXOP, the non-initial data unit according to the transmit bandwidth parameter of the non-initial data unit.

2. The method of claim 1, wherein the step of obtaining the TXOP comprises:

transmitting a request to send a Request to Send (RTS) frame; and receiving a clear to send a Clear to Send (CTS) frame.

3. The method of claim 2, wherein the RTS frame includes a RTS bandwidth and the CTS frame includes a CTS bandwidth.

4. The method of claim 3, wherein the CTS bandwidth is equal to or less than the RTS bandwidth.

5. The method of claim 4, wherein the transmit bandwidth parameter of the preceding data unit of the plurality of data units is the CTS bandwidth when the preceding data unit is an initial data unit of the plurality of data units.

6. The method of claim 1, wherein the step of obtaining, by the transmitter, the transmission opportunity (TXOP) for the bandwidth comprises:

obtaining, by the transmitter, the transmission opportunity (TXOP) for a bandwidth greater than 20 MHz.

7. A device configured to transmit a data frame in a wireless local area network, the device comprising:

a transceiver; and a controller operatively connected to the transceiver and configured to obtain a transmission opportunity (TXOP) for a bandwidth, the TXOP indicating an interval of time when the transmitter has a right to exchange frame sequences, if a specific condition in the TXOP is determined to have been met, set a transmit bandwidth parameter of a non-initial data unit of a plurality of data units to be the same or narrower than a transmit bandwidth parameter of a preceding data unit of the plurality of data units, and transmit, during the TXOP, the non-initial data unit according to the transmit bandwidth parameter of the non-initial data unit.

8. The device of claim 7, wherein controller is configured to:

transmit a request to send a Request to Send (RTS) frame; and receive a clear to send a Clear to Send (CTS) frame.

9. The device of claim 8 wherein the RTS frame includes a RTS bandwidth and the CTS frame includes a CTS bandwidth.

10. The device of claim 9, wherein the CTS bandwidth is equal to or less than the RTS bandwidth.

11. The device of claim 10, wherein the transmit bandwidth parameter of the preceding data unit of the plurality of data units is the CTS bandwidth when the preceding data unit is an initial data unit of the plurality of data units.

12. The device of claim 7, wherein the controller is configured to:

obtain the transmission opportunity (TXOP) for a bandwidth greater than 20 MHz.

* * * * *